United States Patent
Kritt et al.

(10) Patent No.: US 9,380,144 B1
(45) Date of Patent: Jun. 28, 2016

(54) MOBILE WIRELESS COMMUNICATION DEVICE EMERGENCY MODE

(71) Applicant: Lenovo Enterprise Solutions (Singapore) PTE. LTD., New Tech Park (SG)

(72) Inventors: Barry A. Kritt, Emerald Isle, NC (US); Sarbajit K. Rakshit, Kolkata (IN)

(73) Assignee: Lenovo Enterprise Solutions (Singapore) PTE. LTD., New Tech Park (SG)

(*) Notice: Subject to any disclaimer, the term of this patent is extended or adjusted under 35 U.S.C. 154(b) by 0 days.

(21) Appl. No.: 14/610,342

(22) Filed: Jan. 30, 2015

(51) Int. Cl.
*H04M 11/04* (2006.01)
*H04M 1/725* (2006.01)
*H04W 4/22* (2009.01)
*H04W 4/02* (2009.01)

(52) U.S. Cl.
CPC ...... *H04M 1/72538* (2013.01); *H04M 1/72525* (2013.01); *H04W 4/021* (2013.01); *H04W 4/22* (2013.01)

(58) Field of Classification Search
CPC ..................... H04M 1/72538; H04M 1/72525; H04W 4/021; H04W 4/22
USPC .......................... 455/404.1, 404.2, 418, 456.3
See application file for complete search history.

(56) References Cited

U.S. PATENT DOCUMENTS

| | | | |
|---|---|---|---|
| 8,238,944 B2 | 8/2012 | Neumann | |
| 8,624,727 B2 | 1/2014 | Saigh et al. | |
| 2002/0013723 A1* | 1/2002 | Mise | G06Q 20/104 705/304 |
| 2007/0139182 A1* | 6/2007 | O'Connor | G08B 27/006 340/521 |
| 2007/0149214 A1* | 6/2007 | Walsh et al. | 455/456.1 |
| 2009/0316683 A1* | 12/2009 | Gass | H04L 12/4679 370/352 |
| 2009/0325538 A1* | 12/2009 | Sennett et al. | 455/404.2 |
| 2010/0151814 A1* | 6/2010 | Bragg | H04M 1/72536 455/404.2 |
| 2012/0064855 A1* | 3/2012 | Mendelson | G01C 21/206 455/404.2 |
| 2013/0040600 A1* | 2/2013 | Reitnour et al. | 455/404.2 |
| 2014/0051379 A1 | 2/2014 | Ganesh et al. | |
| 2014/0066000 A1* | 3/2014 | Butler | 455/404.2 |
| 2014/0111018 A1* | 4/2014 | Kwon et al. | 307/104 |
| 2014/0269557 A1* | 9/2014 | Mechaley, Jr. | 370/329 |

OTHER PUBLICATIONS

"Mobile Disaster Recovery", AT&T, accessed online Nov. 4, 2014 <http://www.business.att.com/enterprise/Family/mobility-services/mobile-disaster-recovery/, 2014, 1 pp.

Karim, et al., "Development of automatic geo-fencing and accidental monitoring system based on GPS technology", International Journal of Computer Science, Engineering and Applications, vol. 3, No. 4, Aug. 2013, 9 pp.

West, et al., "How Mobile Devices are Transforming Disaster Relief and Public Safety", Issues in Technology Innovation, Jul. 2013, 18 pp.

Choudhary, et al., "Wireless Power Transmission: An Innovative Idea", International Journal of Educational Planning & Administration, vol. 1, No. 3, 2011, pp. 203-210.

(Continued)

*Primary Examiner* — Mong-Thuy Tran
(74) *Attorney, Agent, or Firm* — Katherine Brown

(57) ABSTRACT

A mobile wireless communication device has an emergency mode. The mobile wireless communication device can enter the emergency mode automatically and without user interaction, responsive to an instruction to do so. Upon entering the emergency mode, information related to an emergency functionality of the emergency mode is transmitted to an emergency response computing device.

18 Claims, 3 Drawing Sheets

(56) References Cited

OTHER PUBLICATIONS

"Be 'Mobile Phone Prepared' for a Disaster", Australian Government Attorney General's Department brochure, Oct. 20, 2012, 2 pp.

Sung, "How can we use mobile apps for disaster communications in Taiwan: Problems and Possible Practice", National Cheng Che University, IMICS, Jun. 28, 2011, 15 pp.

"AT&T Remote Mobility Zone, HSPA/HSPA+ fixed solutions", AT&T Brief, May 30, 2014, 4 pp.

* cited by examiner

US 9,380,144 B1

MOBILE WIRELESS COMMUNICATION DEVICE EMERGENCY MODE

BACKGROUND

Emergencies, while relatively rare, are still unfortunately still sufficiently common that emergency response personnel, including fire, police, and medical personnel, have to respond to a variety of different types of emergencies. Some emergencies are natural in cause, such as earthquakes, hurricanes, tsunamis, tornadoes, and so on. Other emergencies may be manmade, such as fires. Still other emergencies are manmade, resulting from malicious actions by individuals wishing to imperil other people by their actions.

SUMMARY

An example non-transitory computer-readable data storage medium stores computer-executable code executable by a communication device. The computer-executable code includes first code to receive an instruction to enter an emergency mode. The computer-executable code includes second code to enter the emergency mode responsive to the first code receiving the instruction. The computer-executable code includes third code to perform emergency functionality while in the emergency mode automatically and without interaction with a user of the communication device. The emergency functionality includes capturing audio information within an area proximate to the communication device and transmitting the audio information to an emergency response computing device designated within the instruction.

An example method includes receiving, by an emergency response computing device, designation of a geofence boundary around an emergency area. The method includes transmitting, by the emergency response computing device, an authorized request to a mobile wireless communication device services provider to send an instruction to each of a number of mobile wireless communication devices located within the geofence boundary to enter an emergency mode. The method includes after receiving, by the emergency response computing device, confirmation from the mobile wireless communication device services provider that the instruction to enter the emergency mode has been sent to each mobile wireless communication device located within the geofence boundary. The method includes receiving and outputting, by the emergency response computing device, information from the mobile wireless communication devices that have entered the emergency mode, the information related to emergency functionality that the mobile wireless communication devices perform after having entered the emergency mode.

An example mobile wireless communication device includes a first wireless communication transmitter to communicate over a mobile wireless communication network managed by a mobile wireless communication network services provider. The mobile wireless communication device includes a second wireless communication transmitter to communicate over a temporary wireless communication network different than the mobile wireless communication network and managed by an emergency response computing device. The mobile wireless communication device includes a processor and a memory storing processor-executable code that the processor executes. The processor executable code is executed by the processor to receive an instruction from the mobile wireless communication network services provider over the mobile wireless communication network to enter an emergency mode, the instruction including connectivity information regarding how to connect to the temporary wireless communication network. The processor executable code is executed by the processor to responsive to receiving the instruction, enter the emergency mode and connect to the temporary wireless communication network using the connectivity information within the instruction, automatically and without user interaction. The processor executable code is executed by the processor to, after entering the emergency mode, transmitting information related to an emergency functionality of the emergency mode to the emergency response computing device over the temporary wireless communication network.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

Figure 1:
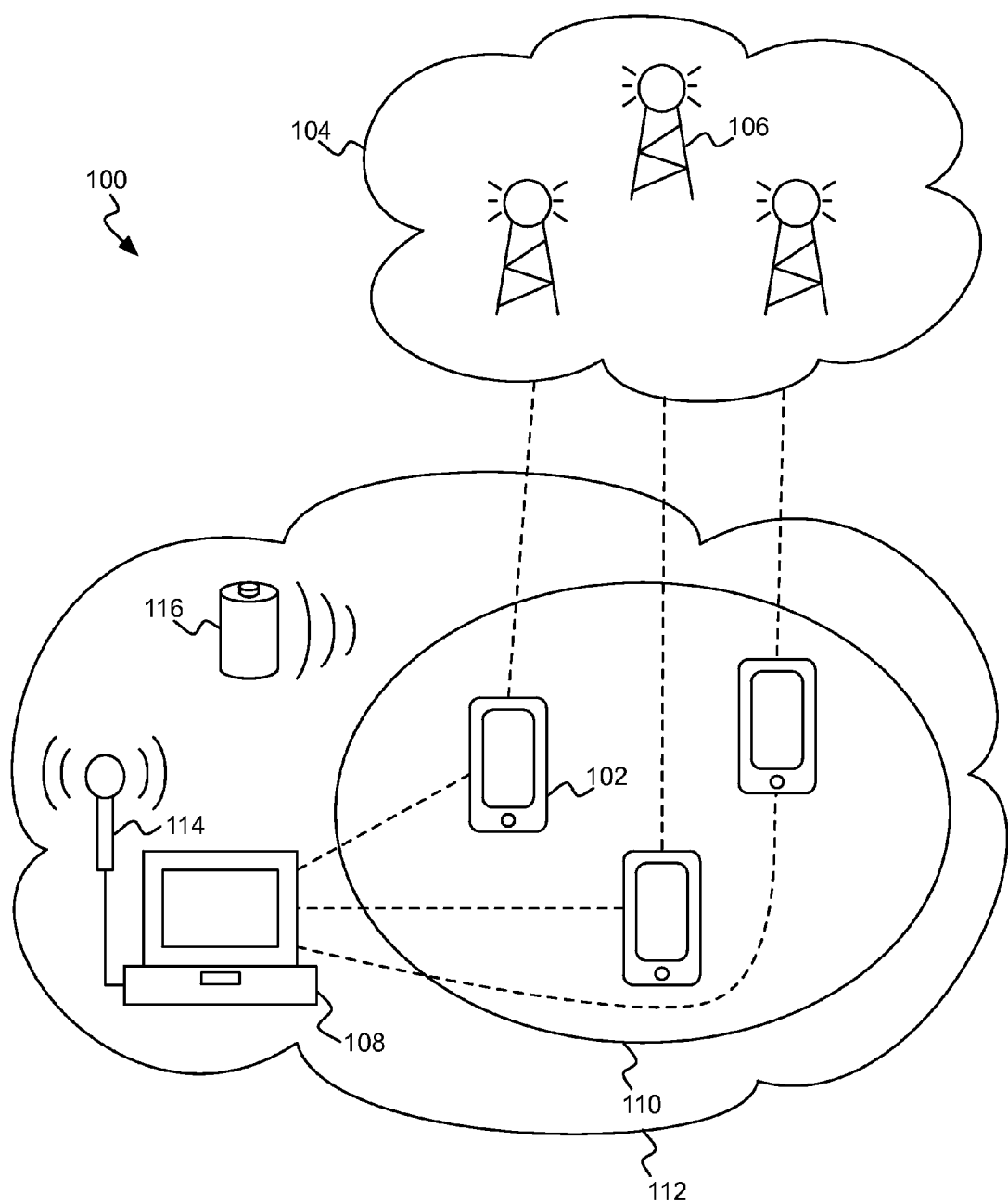
FIG. 1 is a diagram of an example emergency in which mobile wireless communication devices enter an emergency mode to assist emergency response personnel.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background, there are many different types of emergencies. A common denominator to nearly all emergencies, however, is that emergency response personnel want to quickly assess the number, locations, and safety of people affected by a given emergency. As one example, in an earthquake that has leveled a building, these personnel need to be able to determine how many people are trapped in the rubble, as well as where the people are located and whether they are safe. The speed at which this information can be obtained can greatly affect how successfully the ultimate outcome of the rescue effort is.

Disclosed herein are techniques to utilize a nearly ubiquitous feature of modern life—mobile wireless communication devices, particularly mobile phones such as smartphones—to assist emergency response personnel to acquire this information quickly. Most people carry smartphones—or at least mobile phones like feature phones or so-called simple phones—on them most of the time. The techniques disclosed herein leverage this fact to ensure that emergency response personnel can quickly get a handle on a given emergency situation as to the number of people that may be affected, where they are located, and whether they are currently safe or in need of immediate assistance.

Specifically, a mobile wireless communication device is provided with the capability to automatically and without user interaction enter an emergency mode, via an instruction received over a mobile wireless communication network. Upon entering this emergency mode, the device continually—such as continuously or periodically—transmits information automatically and without user interaction to an emergency response computing device, which may have set up a temporary wireless communication network for this purpose. Such information can include audio information within the area proximate to the device, as well as visual information, including video and/or still images. The information can also include locational information as to the locational position of the device, motion information as to whether motion has been detected near the device, and so on.

Any sensors that a given mobile wireless communication device has, in other words, can thus be leveraged to provide the emergency response personnel with a better awareness of the severity of the emergency. The personnel may use this information to determine the number of people affected by the emergency, and where the people are located. The information may be used to assess which people require medical attention first, for instance, and thus where scarce emergency response resources should first be allocated, as well as whether more resources are needed.

FIG. 1 shows an example emergency depicting how mobile wireless communication devices enter an emergency mode to assist emergency response personnel. Users having associated mobile wireless devices 102 are present in and may be affected by the emergency. The mobile wireless devices 102 are able to communicate over a mobile wireless communication network 104 having cellular transmitting and receiving towers 106 and the like. Examples of the mobile wireless communication network 104 include cellular and mobile networks, such as those that communicate over second generation (2G), third generation (3G), and fourth generation (4G) protocols, an example of the latter being the long term evolution (LTE) protocol.

The users may have subscriptions with mobile wireless communication device services providers that permit the users to use the mobile wireless devices 102 on an everyday basis to make and receive phone calls, access the Internet, and perform other types of voice- and data-related functionality. Even if the users do not have active subscriptions, however, many regulatory bodies may require that such providers ensure that any mobile wireless device 102 that is compatible with their mobile wireless communication network 104 be able to perform certain limited functionality, such as calling 911 in the United States in particular. The emergency mode described herein may thus become part of this guaranteed functionality.

Emergency response personnel arriving at the scene of the emergency have an emergency response computing device 108, such as a laptop or notebook computer, or another type of device. The personnel define a geofence area 110 around the location in which the users of the mobile wireless communication devices 102 are thought to be. The personnel also can set up a temporary wireless communication network 112 that includes the geofence area 110. For instance, the emergency response computing device 108 may include or be communicatively connected to a wireless transmitter 114 by which such a network 112 can be temporarily created. Examples of the wireless transmitter 114 include wireless routers, access points, and so on.

The temporary wireless communication network 112 can be a Wi-Fi network, a Bluetooth network, or a different type of wireless communication network. In general, the temporary wireless communication network 112 may be of a different type than the mobile wireless communication network 104 itself. This is for at least two reasons. First, not all the mobile wireless communication devices 102 may be able to currently communicate with the mobile wireless communication network 104, due to their location within the emergency, but may still be able to come with the temporary wireless network 112. Second, in general, mobile wireless communication devices 102 typically use more power to communicate with a 2G, 3G, or 3G-type telecommunications network than they do to communicate with a smaller network such as a Wi-Fi or Bluetooth network.

The emergency response personnel may also deploy a wireless recharge device 116 within the area of the emergency. Some types of mobile wireless communication devices 102 have the capability to recharge their batteries without having to be connected by a cable to a power source. Rather, such mobile wireless devices 102 can receive power wirelessly from a wireless recharge device 116. Thus, deploying the wireless recharge device 116, along with having the mobile wireless devices 102 communicate over a less-power intensive temporary wireless communication network 112, ensure that the scarce battery resources of the devices 102 last as long as possible during the emergency.

Once the emergency response personnel have defined the geofence area 110 and have set up the temporary wireless communication network 112, they request that each mobile wireless communication device 102 within the area 110 be transmitted an instruction to enter the emergency mode. Only an entity such as the mobile wireless communication device services provider itself may actually be able to send such an instruction, to ensure the privacy of the users of the mobile wireless devices 102 when not in an emergency. Furthermore, the provider may respond only to requests from authorized emergency response personnel to send the instruction.

Once the mobile wireless communication devices 102 have been instructed to enter the emergency mode, they can do so automatically and without user interaction. This can be advantageous where the users are unable to reach their mobile wireless devices 102. For example, the users may be sufficient incapacitated as a result of the emergency to the extent that they cannot interactively use the mobile wireless devices 102.

However, in one implementation, entry of the emergency mode may be preceded by a mobile wireless device 102 requesting that its user indicate whether or not he or she requires assistance in the emergency. If the user responds that no assistance is required—for instance, the user may be an emergency response person as opposed to non-emergency response personnel affected by the emergency, or the user may not require assistance—then the user's mobile wireless device 102 does not enter the emergency mode. But if the user does not respond after a specified length of time, or responds that he or she requires assistance, then the mobile wireless device 102 enters the emergency mode.

Some mobile wireless communication devices 102 may not be able to receive the instruction to enter the emergency mode, because as noted above, the devices 102 may not have sufficient reception to communicate with the mobile wireless communication network 104. Therefore, when a mobile wireless device 102 enters the emergency mode, it can attempt to contact other devices 102 that are nearby, such as via Bluetooth or in another manner. When such a latter mobile wireless device 102 is contacted that has not received the instruction over the mobile wireless communication network 104 to enter the emergency mode, it is instructed to enter the emergency mode. As such, a given mobile wireless device 102 may enter the emergency mode in one of two ways: via an instruction received from over the network 104, or via an instruction received from another device 102. The mobile wireless device 102 may not be permitted to send an instruction to another device 102 to enter the emergency mode unless it already is in the emergency mode, to ensure that a user not in an actual emergency is unable to accidentally or otherwise direct another device 102 to enter the emergency mode.

While in the emergency mode, each mobile wireless communication device 102 performs emergency functionality that can assist the emergency response personnel. Such emergency functionality includes acquiring information and sending the information to the emergency response computing device 108, such as over the temporary wireless communication network 112. This information can include audio information and visual information (e.g., video and/or still images), as well as locational information as to the location of the mobile wireless device 102 and whether, the type of, and/or the extent to which motion has been detected by the device 102. As noted above, the type of information is dependent on the type of mobile wireless device 102: smartphones may be able to provide more modalities of information that simple phones, which may be able to just capture and transmit audio information.

The emergency response computing device 108 outputs this information in a meaningful way for utilization by the emergency response personnel. For example, the computing device 108 may map the locations of each mobile wireless communication device 102 graphically on a map of the area. Each mobile wireless device 102 may be color-coded based on a determination as to the severity of the condition of the user of the device 102. For example, if no motion is detected and no audio is captured by a mobile wireless device 102, this can indicate that the user of the device 102 has a more severe current condition than the user of a device 102 who is moving around and talking Emergency response personnel may be able to interact with the computing device 108 to review the audio and/or visual information that has been recorded by the mobile wireless devices 102 on a per-device 102 basis. The computing device 108 may be able to show the real-time visual information that the mobile wireless devices 102 have captured. In this way, the emergency response personnel can quickly grasp the severity of the emergency, and respond accordingly.

Figure 2:
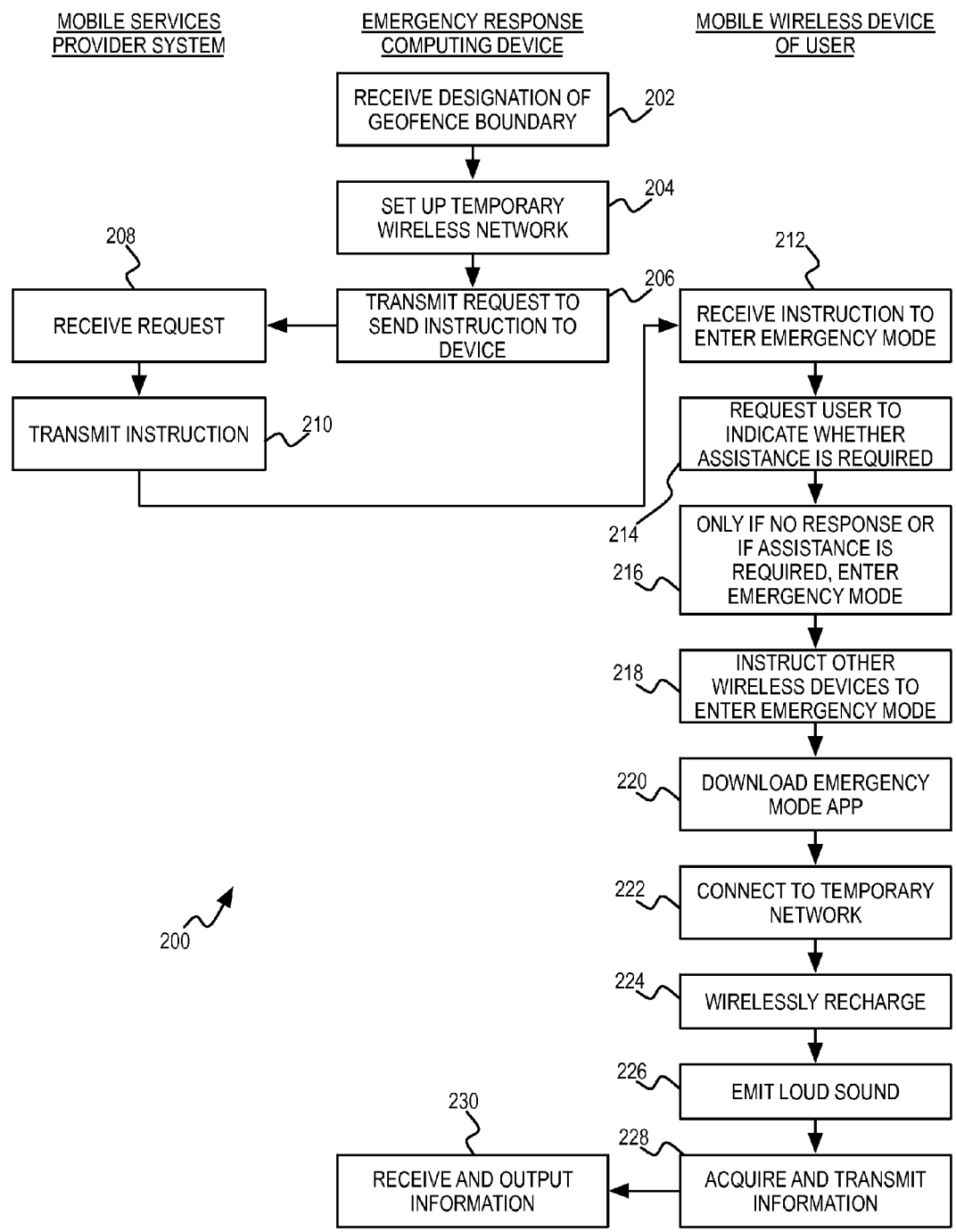
FIG. 2 is a flowchart of an example method with respect to an emergency mode of a wireless communication device.

FIG. 2 shows an example method 200 depicting how the emergency mode that has been described is entered, operates, and is used in an emergency. Parts of the method 200 in the left column may be performed by the system of a mobile wireless communications services provider that administers a mobile wireless communications network, such as the mobile wireless communications network 104. Parts of the method 200 in the middle column may be performed by an emergency response computing device, such as the emergency response computing device 108, which emergency response personnel employ to assist in the response to the emergency. Parts of the method 200 in the right column may be performed by a mobile wireless communication device of a user affected by the emergency, such as the mobile wireless communication device 102.

Emergency response personnel define a geofence boundary around an emergency area, such as to define the geofence area 110. The emergency response computing device receives the designation of the geofence area (202). The emergency response personnel can use the emergency response computing device to also set up a temporary wireless communication network (204), such as the temporary wireless communication network 112. As noted above, the temporary wireless network 112 is different than the mobile wireless communication network 104, such as being of a different type of network than the mobile wireless network 104.

The emergency response computing device, at the direction of the emergency response personnel, can transmit a request to the mobile wireless communication services provider to transmit an instruction to each mobile wireless communication device within the geofence boundary to enter the emergency mode (206). The instruction can include connectivity information regarding how to connect to the temporary wireless communication network that has been set up. This connectivity information may include the name of an access point, such as the wireless transmitter 114, and a password to connect to the access point, for instance.

The mobile wireless communication services provider receives the request (208), and after verifying that the request has been transmitted by authorized emergency response personnel, transmits an instruction to each mobile wireless communication device within the geofence boundary to enter the emergency mode (210). The services provider may transmit confirmation to the emergency response computing device that the instruction has been sent. As noted above, the instruction is initially transmitted over the mobile wireless communication network, and not over the temporary wireless network that may have been set up. Thus, a mobile wireless device receives the instruction to enter the emergency mode (212) over the mobile wireless communication network.

The mobile wireless communication device may request that the user indicate whether assistance is required (214), such as by automatically turn on and/or overriding any other task currently being performed on the mobile device. The mobile wireless device enters the emergency mode only if there is no response or if the user indicates that assistance is required (216). That is, if the user affirmatively indicates that assistance is not required, then the mobile wireless device does not enter the emergency mode.

The mobile wireless communication device may instruction other mobile wireless communication devices located nearby—and thus presumably within the geofence boundary—to enter the emergency mode as well (218). The mobile wireless communication device may have been directed by the instruction 210 to download and install an emergency mode application program, in which case it does so, or automatically does so, without user interaction (220). The emergency mode application program may assist with providing emergency functionality while the mobile wireless device is in the emergency mode. Having such an application program downloaded ensures that even older mobile wireless devices can be kept up to date to be compatible with the software running on the emergency response computing device.

If a temporary wireless communication network has been set up, and if connectivity information has been provided within the instruction, the mobile wireless communication device also connects to the temporary wireless network (222). The mobile wireless device may wirelessly recharge, too, as part of the emergency functionality provided in the emergency mode (224), if the emergency personnel have located a wireless recharge device proximate to the emergency area in which the mobile wireless device is located. The mobile wireless device may further, as part of the emergency functionality and in one implementation as requested by the emergency response computing device in an instruction transmitted to the mobile wireless device, emit a loud sound (226). This loud sound can assist the emergency personnel in locating the mobile wireless device, and thus the user of the device.

As part of the emergency functionality associated with the emergency mode, the mobile wireless communication device continually—such as constantly or periodically—acquires and transmits information to the emergency response computing device (228). If a temporary wireless communication network has been set up, the information is transmitted over the temporary wireless network, and not over the mobile wireless communication network by which the mobile wireless device received the instruction to enter the emergency mode. If a temporary wireless network has not been set up, however, then the information is transmitted over the mobile wireless communication network to the emergency response computing device.

As noted above, the information that the mobile wireless communication device acquires can be of different types, depending on the modalities of information that the mobile wireless device is able to acquire. Audio and visual information within the area proximate to the mobile wireless device may be captured. The location of the mobile wireless communication device may be determined, such as via a global positioning satellite (GPS) capability of the device, or in another manner. Motion within the area proximate to the mobile wireless device may be detected, such as via a motion detector, an accelerometer, and so on, of the device. In general, then, the information is related to the emergency functionality that the mobile wireless device performs after entering the emergency mode.

The emergency response computing device receives and outputs the information (230), to assist emergency personnel in responding to the emergency at hand. As noted above, outputting the information can include mapping the approximate location of the mobile wireless communication device, and determining and indicating a severity of the condition of the user of the mobile wireless device based on the information received from the mobile wireless device. In this respect, outputting the information can include indicating whether the mobile wireless device has entered the emergency mode automatically and without user interaction, or as a result of the user confirming entry into the emergency mode by indicating that assistance is required. In the former instance, the user may be incapacitated and may require assistance sooner as opposed to if the user indicates that assistance is required but that such assistance is relatively minor.

Figure 3:
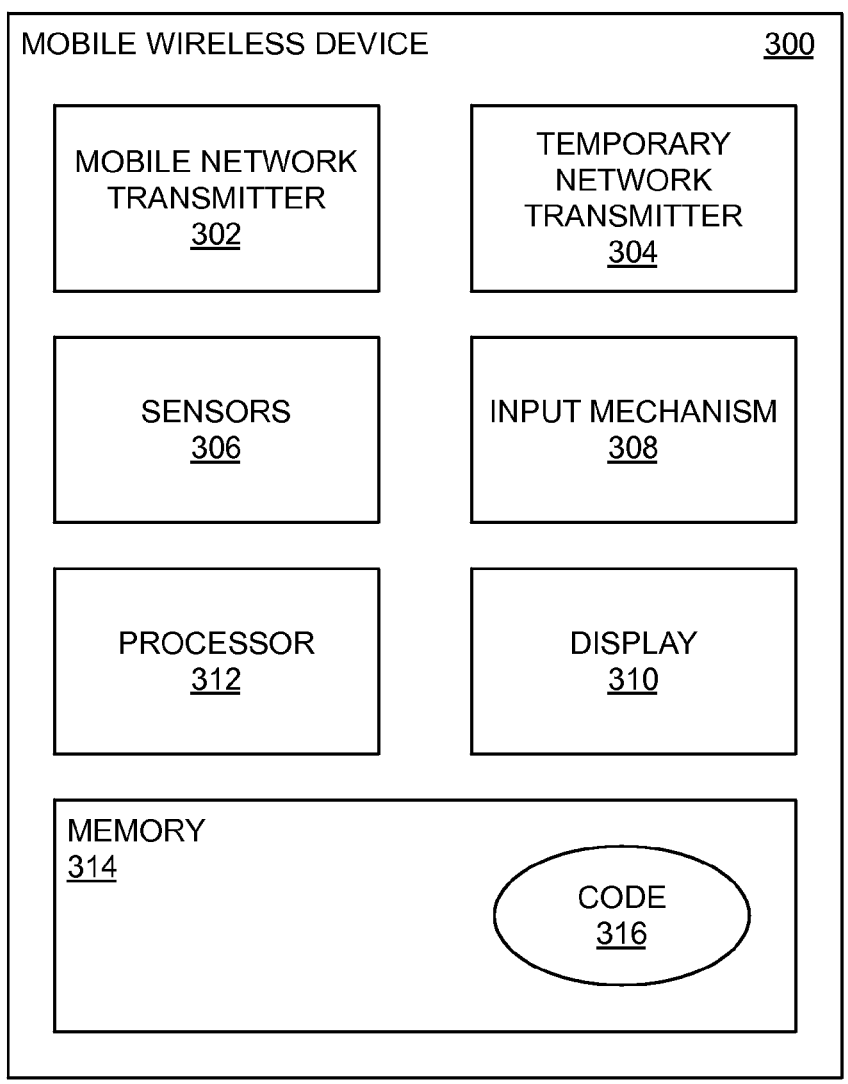
FIG. 3 is a diagram of an example mobile wireless communication device having an emergency mode.

FIG. 3 shows an example mobile wireless communication device 300, which may implement any of the mobile wireless communication devices 102. As such, the mobile wireless device 300 may be a smartphone, as well as another type of mobile wireless device. The mobile wireless device 300 includes two wireless communication transmitters: a mobile network transmitter 302, and a temporary network transmitter 304. The former is for communicating with a mobile wireless communication network managed, such as the mobile wireless network 104, whereas the latter is for communing with a temporary wireless communication network, such as the temporary wireless network 112. The transmitter 302 therefore transmits over a frequency in which, for instance, a 2G, 3G, or 4G protocol is commonly employed, whereas the transmitter 304 transmits over a frequency in which, for instance, a Wi-Fi or Bluetooth protocol is commonly employed.

The mobile wireless communication device 300 includes one or more hardware sensors 306. The sensors 306 can include microphones to capture audio information, cameras to capture visual information, monitor detectors to detect motion, positional sensors to determine a position of the mobile wireless device 300, and so on. The mobile wireless device 300 includes an input mechanism 308, such as a touch-screen, as well as a display 310, such as a liquid crystal display (LCD). The mobile wireless device 300 can include other hardware as well, such as speakers, and other types of hardware. The mobile wireless communication devices 300 includes a processor 312 and memory 314. The memory 314 can be volatile memory and/or non-volatile memory. The memory 314 stores processor-executable code 316. The processor 312 thus executes the code 316 to perform the emergency functionality that has been described herein.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A non-transitory computer-readable data storage medium storing computer-executable code executable by a communication device, the computer-executable code comprising:
   first code to receive over a mobile wireless communication network from a mobile wireless communication device services provider, an instruction to enter an emergency mode and to download and install an emergency mode application program, the instruction including connectivity information regarding how to connect to a temporary wireless communication network over which the emergency mode application mode communicates;
   second code to enter the emergency mode responsive to the first code receiving the instruction, and after entering the emergency mode, download, automatically and without interaction with the user of the communication device, the emergency mode application program identified in the instruction to enter the emergency mode over the mobile wireless communication network; and
   third code to connect to the temporarily wireless communication network and to automatically execute the emergency mode application program without user interaction to perform emergency functionality while in the emergency mode automatically and without interaction with a user of the communication device,
   wherein the emergency functionality comprises:
      capturing audio information and transmitting the audio information over the temporary wireless communication network to an emergency response computing device designated within the instruction.

2. The non-transitory computer-readable data storage medium of claim 1, wherein the second code is to, responsive to the first code receiving the instruction:
   request the user of the communication device to indicate whether the user requires assistance;
   enter the emergency mode responsive to the user indicating that the user requires assistance;
   enter the emergency mode responsive to the user not providing any input after a specified length of time; and
   not entering the emergency mode responsive to the user indicating that the user does not require assistance.

3. The non-transitory computer-readable data storage medium of claim 1, wherein the second code is to, after entering the emergency mode:
   instruct other communication devices located near the communication device to enter the emergency mode.

4. The non-transitory computer-readable data storage medium of claim 1, wherein the emergency functionality further comprises:
   capturing visual information within the area proximate to the communication device and transmitting the video information to the emergency response computing device.

5. The non-transitory computer-readable data storage medium of claim 1, wherein the emergency functionality further comprises:
   determining a location of the communication device and transmitting the location to the emergency response computing device.

6. The non-transitory computer-readable data storage medium of claim 1, wherein the emergency functionality further comprises:
   detecting motion within the area proximate to the communication device and transmitting the motion to the emergency response computing device.

7. The non-transitory computer-readable data storage medium of claim 1, wherein the emergency functionality further comprises:
  emitting a loud sound adapted to permit emergency personnel to locate the communication device.

8. The non-transitory computer-readable data storage medium of claim 1, wherein the emergency functionality further comprises:
  wirelessly recharge a battery of the communication device responsive to receiving a wireless recharging signal.

9. A method comprising:
  receiving, by an emergency response computing device, designation of a geofence boundary around an emergency area;
  transmitting, by the emergency response computing device, an authorized request to a mobile wireless communication device services provider to send an instruction over a mobile wireless communication network to each of a plurality of mobile wireless communication devices located within the geofence boundary to enter an emergency mode and to download from over the mobile wireless communication network, install, and execute automatically an emergency mode application program, the instruction including connectivity information regarding how to connect to a temporary wireless communication network over which the emergency mode application program communicates; and
  after receiving, by the emergency response computing device, confirmation from the mobile wireless communication device services provider that the instruction to enter the emergency mode has been sent to each mobile wireless communication device located within the geofence boundary,
    receiving and outputting, by the emergency response computing device, information received over the temporary wireless communication network from the mobile wireless communication devices that have entered the emergency mode and that have downloaded from over the mobile wireless communication network and installed the emergency mode application program, the information related to emergency functionality that the mobile wireless communication devices perform after having entered the emergency mode, the information received over the temporary wireless communication over from the emergency mode application program running on the mobile wireless communication devices.

10. The method of claim 9, further comprising:
  transmitting, by the emergency response computing device, to each mobile wireless communication device that has entered the emergency mode an instruction to emit a loud sound adapted to permit emergency personnel to locate the mobile wireless communication device.

11. The method of claim 9, wherein the information related to the emergency functionality that is received comprises one or more of:
  audio information within areas proximate to the mobile wireless communication devices;
  visual information within the areas proximate to the mobile wireless communication devices;
  locational information of the mobile wireless communication devices;
  motion information within the areas proximate to the mobile wireless communication devices.

12. The method of claim 9, further comprising:
  locating a wireless recharge device proximate to the emergency area to transmit a wireless recharging signal by which batteries of the mobile wireless communication devices that have entered the emergency mode can wirelessly recharge.

13. The method of claim 9, further comprising:
  setting up, by the emergency response computing device, the temporary wireless communication network different than the mobile wireless communication network by which mobile wireless communication devices communicate receive mobile wireless communication services via the mobile wireless communication device services provider.

14. The method of claim 9, wherein the information related to the emergency functionality is received by the emergency response computing device from at least one mobile wireless communication device that did not receive the instruction to enter the emergency mode from the mobile wireless communication device provider and that received the instruction to enter the emergency mode from one of the mobile wireless communication devices that did receive the instruction to enter the emergency mode from the mobile wireless communication device provider.

15. The method of claim 9, wherein outputting the information related to the emergency functionality comprises:
  mapping an approximate location of each mobile wireless communication device that has entered the emergency mode;
  indicating whether each mobile wireless communication device has entered the emergency mode automatically and without user interaction or has entered the emergency mode via a user of the mobile wireless communication device confirming entry into the emergency mode;
  determining and indicating a degree of severity of the condition of the user of each mobile wireless communication device based on one or more of audio, video, and locational information received from the mobile wireless communication device.

16. A mobile wireless communication device comprising:
  a first wireless communication transmitter to communicate over a mobile wireless communication network managed by a mobile wireless communication network services provider;
  a second wireless communication transmitter to communicate over a temporary wireless communication network different than the mobile wireless communication network and managed by an emergency response computing device;
  a processor; and
  a memory storing processor-executable code that the processor executes to:
    receive an instruction from the mobile wireless communication network services provider over the mobile wireless communication network to enter an emergency mode and to download and install an emergency mode application program, the instruction including connectivity information regarding how to connect to the temporary wireless communication network over which the emergency mode application program communicates;
    responsive to receiving the instruction, enter the emergency mode;
    and after entering the emergency mode, download, automatically and without interaction with the user of the communication device, the emergency mode application program identified in the instruction to enter the emergency mode over the mobile wireless communication network, connect to the temporary wireless communication network using the connectivity information within the instruction, automatically and without user interaction;

after connecting to the temporary wireless communication network, automatically and without user interaction executing the emergency mode application program to transmit information related to an emergency functionality of the emergency mode to the emergency response computing device over the temporary wireless communication network.

17. The mobile wireless computing device of claim 16, wherein the processor-executable code that is stored by the memory is further executed by the processor to, responsive to receiving the instruction:

request the user of the mobile wireless communication device to indicate whether the user requires assistance;

enter the emergency mode responsive to the user indicating that the user requires assistance;

enter the emergency mode responsive to the user not providing any input after a specified length of time; and not entering the emergency mode responsive to the user indicating that the user does not require assistance.

18. The mobile wireless computing device of claim 16, wherein the information related to the emergency functionality of the emergency mode comprises one or more of:

audio information within an area proximate to the mobile wireless communication device;

visual information within the area proximate to the mobile wireless communication device;

locational information of the mobile wireless communication device;

motion information within the area proximate to the mobile wireless communication device.

* * * * *